(12) United States Patent
Haase et al.

(10) Patent No.: US 9,643,492 B2
(45) Date of Patent: May 9, 2017

(54) MOTOR VEHICLE HAVING A FUEL CELL

(71) Applicant: Bayerische Motoren Werke Aktiengesellschaft, Munich (DE)

(72) Inventors: Stefan Haase, Munich (DE); Andreas Buchner, Steinebach (DE); Michael Bauer, Unterfoehring (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/807,555

(22) Filed: Jul. 23, 2015

(65) Prior Publication Data

US 2015/0328984 A1 Nov. 19, 2015

Related U.S. Application Data

(63) Continuation of application No. PCT/EP2013/075768, filed on Dec. 6, 2013.

(30) Foreign Application Priority Data

Jan. 24, 2013 (DE) ........................ 10 2013 201 122

(51) Int. Cl.
*F16H 37/00* (2006.01)
*B60K 25/00* (2006.01)
*B60L 11/18* (2006.01)
*B60K 1/04* (2006.01)
*B60K 6/32* (2007.10)

(52) U.S. Cl.
CPC ............... *B60K 25/00* (2013.01); *B60K 1/04* (2013.01); *B60K 6/32* (2013.01); *B60L 11/1881* (2013.01); *B60K 2025/005* (2013.01); *H01M 2250/20* (2013.01); *Y02T 90/32* (2013.01); *Y02T 90/34* (2013.01)

(58) Field of Classification Search
CPC .... B60K 6/26; B60K 6/48; B60K 6/32; B60L 1/003; B60L 1/02; B60L 7/14; B60L 11/14; B60L 11/1887; B60L 11/1894; B60L 15/20; B60L 15/2009; Y02T 10/641; Y02T 10/6221; Y02T 90/34; F02D 2400/11
USPC ......................................... 74/15.82; 701/102
See application file for complete search history.

(56) References Cited

U.S. PATENT DOCUMENTS 8,701,804 B1 * 4/2014 Antrobus ................. B60K 6/00
180/302
2003/0042053 A1 3/2003 Yoshikawa et al.
(Continued)

FOREIGN PATENT DOCUMENTS

CN 102458896 A 5/2012
DE 100 21 044 A1 11/2000
(Continued)

OTHER PUBLICATIONS

International Search Report dated Mar. 17, 2014 (Two (2) pages).
(Continued)

*Primary Examiner* — Toan To
(74) *Attorney, Agent, or Firm* — Crowell & Moring LLP

(57) ABSTRACT

In a motor vehicle having a fuel cell, an air compressor provides input air under pressure at the fuel cell and an electric drive motor for driving the motor vehicle, which drive motor can be supplied with electric current by the fuel cell for that purpose, wherein the air compressor is driven by the drive motor.

10 Claims, 1 Drawing Sheet

(56) References Cited

U.S. PATENT DOCUMENTS

| | | | |
|---|---|---|---|
| 2003/0062205 A1 | 4/2003 | Konrad et al. | |
| 2006/0048601 A1* | 3/2006 | Chiao | B60K 6/46 74/640 |
| 2006/0243503 A1* | 11/2006 | Carlson | B60K 6/48 180/65.23 |
| 2008/0059035 A1* | 3/2008 | Siddiqui | B60K 6/445 701/93 |
| 2008/0133109 A1* | 6/2008 | Carlson | B60K 6/26 701/102 |
| 2009/0131215 A1* | 5/2009 | Shamoto | B60K 6/365 477/3 |
| 2009/0194067 A1* | 8/2009 | Peotter | B66C 23/42 123/350 |
| 2010/0065358 A1* | 3/2010 | Harris | B60K 6/48 180/65.265 |
| 2010/0219007 A1* | 9/2010 | Dalum | B60W 30/1888 180/65.22 |
| 2011/0253466 A1 | 10/2011 | Sedoni et al. | |
| 2015/0135863 A1* | 5/2015 | Dalum | B60K 25/00 74/11 |

FOREIGN PATENT DOCUMENTS

| | | |
|---|---|---|
| DE | 101 41 740 A1 | 3/2003 |
| DE | 101 48 213 A1 | 4/2003 |
| DE | 10 2007 007 934 A1 | 8/2008 |
| DE | 10 2007 061 417 A1 | 6/2009 |
| DE | 10 2008 011 831 A1 | 9/2009 |
| DE | 10 2010 052 797 A1 | 5/2012 |
| WO | WO 2010/031771 A2 | 3/2010 |
| WO | WO 2010/140030 A1 | 12/2010 |

OTHER PUBLICATIONS

German Search Report dated Nov. 4, 2013, with Statement of Relevancy (Six (6) pages).

Chinese Office Action issued in Chinese counterpart application No. 201380065434.3 dated Sep. 5, 2016, with English translation (Eleven (11) pages).

* cited by examiner

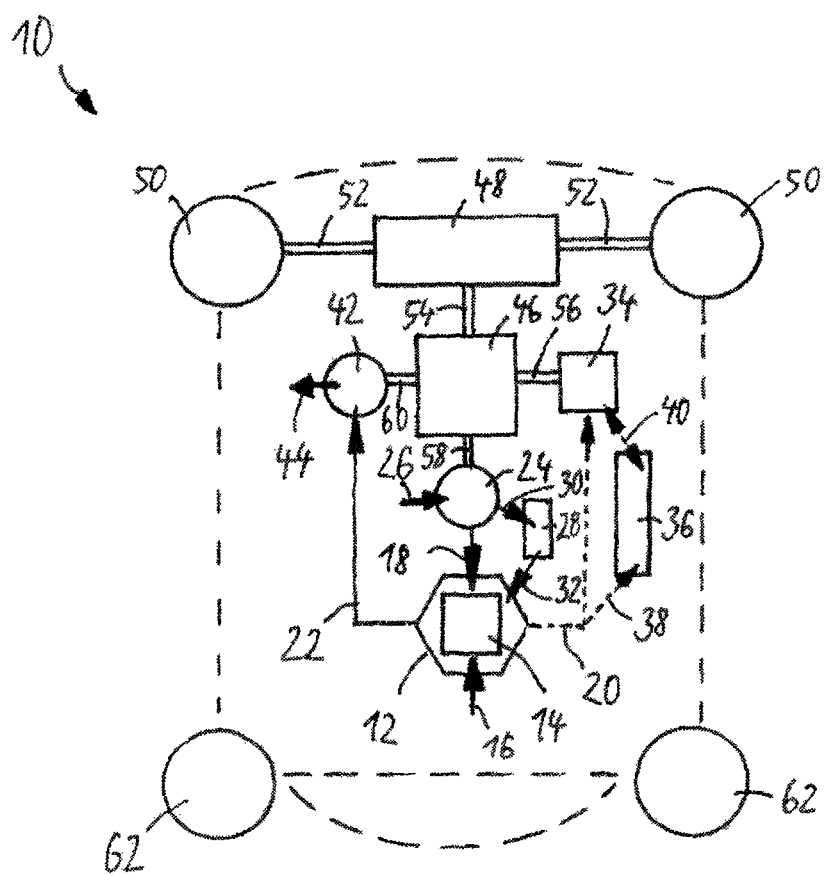

MOTOR VEHICLE HAVING A FUEL CELL

CROSS REFERENCE TO RELATED APPLICATIONS

This application is a continuation of PCT International Application No. PCT/EP2013/075768, filed Dec. 6, 2013, which claims priority under 35 U.S.C. §119 from German Patent Application No. 10 2013 201 122.9, filed Jan. 24, 2013, the entire disclosures of which are herein expressly incorporated by reference.

BACKGROUND AND SUMMARY OF THE INVENTION

The invention relates to a motor vehicle having a fuel cell, an air compressor for providing intake air under pressure to the fuel cell, and an electric drive motor for driving the motor vehicle, which electric drive motor can be supplied with electric current by the fuel cell for this purpose. Furthermore, the invention relates to a method for operating a fuel cell of this type in a motor vehicle.

Fuel cell systems, in particular those of hybrid motor vehicles, have an air compressor or compressed air deliverer for delivering compressed air, by way of which sufficient oxygen for the operation of the associated fuel cell is provided from the surroundings of the fuel cell system. To this end, the air compressor is regulated during operation of the fuel cell system in such a way that it supplies the correct pressure and mass flow of compressed air for the respective operating state of the fuel cell. To this end, the air compressor is driven by a separate electric compressor drive motor. The drive power of the latter can be controlled separately in a corresponding manner in the case of load jumps in the fuel cell.

According to the invention, a motor vehicle having a fuel cell, an air compressor for providing intake air under pressure to or in the fuel cell, and an electric drive motor for driving the motor vehicle is provided. Here, the drive motor can be supplied with electric current by the fuel cell. Moreover, the air compressor of the fuel cell is driven by the drive motor, as it were, in the reverse direction. This driving of the air compressor preferably classically takes place in a mechanical way. To this end, the drive motor is particularly preferably connected to the air compressor by way of a torque-transmitting coupling. The said coupling can advantageously be of coupleable design. In order to improve the overall degree of efficiency, the air compressor can then be decoupled completely from the drive motor in certain operating states.

An otherwise necessary, separate drive for the air compressor is dispensed with by way of the coupling according to the invention of the drive motor to the air compressor of an associated fuel cell. Furthermore, it is possible by way of the drive motor to use the latter in overrun or generator operation during braking operations and to conduct said mechanical overrun power directly into the air compressor. An otherwise necessary conversion into electric current at the drive motor and conversion back into mechanical rotational power at the air compressor are therefore dispensed with.

Decoupling of the air compressor from the drive motor can be advantageous, in particular, when only a small power output is called up at the fuel cell, but the drive motor can provide a greater recuperation power output on account of overrun operation. Said recuperation power output can then be utilized completely in generator operation for electrical energy for buffer-storing in associated batteries.

Furthermore, the coupling is preferably designed with a switchable gear mechanism which can be switched, in particular, into two stages. A gear mechanism of this type can be regulated to two rotational speeds at the gear mechanism output. In this way, two performance ranges can be predefined for the connected air compressor, within which performance ranges said air compressor can deliver its compressed air into a compressed air store. The compressed air can then be provided to the fuel cell as intake air as required and in a finely metered manner from the pressure store device which is preferably designed in the form of a compressed air tank.

Moreover, the gear mechanism can preferably be coupled in a torque-transmitting manner to a drive axle of the motor vehicle. A gear mechanism of this type assumes several functions by serving both to drive an air compressor of the fuel cell and an output axle of the motor vehicle. All the required mechanical drives are therefore present in a combined manner in the gear mechanism. Here, correlations in the case of the required rotational speeds at the individual consumers can advantageously be utilized to keep the complexity of the gear mechanism low.

Furthermore, the gear mechanism according to the invention can preferably be coupled in a torque-transmitting manner to an air expander for discharging waste air under pressure from the fuel cell. An air expander which can be coupled in this way, in particular selectively, provides recuperation power from the waste air which is discharged from the fuel cell under residual pressure. It therefore utilizes the residual enthalpy of said waste air, in order to convert it into mechanical rotational energy and to utilize it for driving the air compressor and/or the drive axle.

The invention is correspondingly also directed to a method for operating a fuel cell in a motor vehicle, in which method intake air is provided under pressure to the fuel cell by way of an air compressor and the motor vehicle is driven by way of an electric drive motor, the air compressor being driven by the drive motor. The drive of the air compressor preferably takes place purely mechanically. Here, the drive motor is preferably connected to the air compressor by way of a torque-transmitting coupling. Said coupling is preferably effected in a coupleable manner. Furthermore, the coupling is preferably designed with a switchable gear mechanism which is switched, in particular, into two stages. Moreover, the gear mechanism is preferably coupled to a drive axle of the motor vehicle in a torque-transmitting manner or the drive axle is likewise coupled to the gear mechanism of this type. The gear mechanism therefore becomes an interface, at which the power which is produced by the fuel cell and the braked drive axle is conducted in an optimum manner into the respectively required application. The gear mechanism can preferably also be coupled in a torque-transmitting manner to an air expander for discharging waste air under pressure from the fuel cell. In this way, the recuperation power which is supplied by an air expander of this type from the waste air of the fuel cell can also be utilized in a use-related manner.

Other objects, advantages and novel features of the present invention will become apparent from the following detailed description of one or more preferred embodiments when considered in conjunction with the accompanying drawing.

BRIEF DESCRIPTION OF THE DRAWING

In the following text, one exemplary embodiment of the solution according to the invention will be explained in greater detail using the appended drawing. The FIGURE shows a schematic diagram of a motor vehicle having a fuel cell according to the invention.

DETAILED DESCRIPTION OF THE DRAWING

A motor vehicle 10 comprises a fuel cell 12, the core of which is an anode/cathode stack 14. Furthermore, a line 16 for feeding hydrogen to the anode/cathode stack 14, a line 18 for feeding intake air to the anode/cathode stack 14, a line 20 for discharging electrical energy from the anode/cathode stack 14, and a line 22 for discharging waste air from the anode/cathode stack 14 are provided on the fuel cell 12. During operation of the fuel cell 12, intake air from the surroundings of the motor vehicle 10 can be conveyed as compressed air into the line 18 by way of an air compressor 24. The intake air is fed to the air compressor 24 through a line 26. The air compressor 24 can provide the intake air directly through the line 18 to the anode/cathode stack 14 or can buffer-store the intake air in a compressed air tank 28. To this end, a line 30 for feeding intake air into the compressed air tank 28 and a line 32 for discharging intake air from the compressed air tank 28 into the anode/cathode stack 14 are provided.

Furthermore, an electric drive motor 34 is situated in the motor vehicle 10, by way of which electric drive motor 34, as will now be explained in greater detail in the following text, the air compressor 24 for the fuel cell 12 can also be driven. Electrical energy can be provided to the drive motor 34 from the fuel cell 12 by means of the line 20. As an alternative, the electrical energy from the fuel cell 12 can be buffer-stored in a battery 36. To this end, the battery 36 is provided on a line 38 for feeding electrical energy from the anode/cathode stack 14 into the battery 36 and a line 40 for discharging the electrical energy from the battery 36 to the drive motor 34. In this way, the drive motor 34 can also be driven at least for a short time, without it already being necessary for electrical energy to be supplied by the fuel cell 12.

In order that energy can also be recuperated from the waste air of the fuel cell 12, an air expander 42 is provided, to which the waste air is fed by means of the line 22. From the air expander 42, the waste air then passes through a line 44 into the surroundings of the vehicle 10.

The drive motor 34 and the air expander 42 are connected to a gear mechanism 46 which, furthermore, is also connected to the air compressor 24 and to a drive axle 48 with two drive wheels 50. To this end, a torque-transmitting coupling 52 is provided between the respective drive wheel 50 and the drive axle 48. The gear mechanism 46 is coupled to the drive axle 48 by way of a torque-transmitting coupling 54. In a similar way, the gear mechanism 46 is coupled to the drive motor 34 by way of a torque-transmitting coupling 56, is coupled to the air compressor 24 by way of a torque-transmitting coupling 58, and is coupled to the air expander 42 by way of a torque-transmitting coupling 60. The couplings 52, 54, 56, 58 and 60 are designed such that they can selectively be opened and closed, with the result that, in particular, the drive motor 34 can distribute its drive power as required both to the drive axle 48 and to the air compressor 24.

Finally, two non-driven wheels 62 are also provided on the motor vehicle 10, which non-driven wheels 62, however, can also as an alternative be incorporated as likewise driven wheels into the above-described drive concept of the drive axle 48 in the form of an all-wheel drive system.

LIST OF DESIGNATIONS

10 Motor vehicle
12 Fuel cell
14 Anode/cathode stack
16 Line, feed of hydrogen into anode/cathode stack
18 Line, feed of intake air into anode/cathode stack
20 Line, discharge of electrical energy from anode/cathode stack
22 Line, discharge of waste air from anode/cathode stack
24 Air compressor
26 Line, feed of intake air from surroundings
28 Compressed air tank
30 Line, feed of intake air into compressed air tank
32 Line, discharge of intake air from compressed air tank
34 Drive motor
36 Battery
38 Line, feed of electrical energy into battery
40 Line, discharge of electrical energy from battery
42 Air expander
44 Line, discharge of waste air to surroundings
46 Gear mechanism
48 Drive axle
50 Drive wheel
52 Coupling, drive axle to drive wheel
54 Coupling, drive axle to gear mechanism
56 Coupling, drive motor to gear mechanism
58 Coupling, air compressor to gear mechanism
60 Coupling, air expander to gear mechanism
62 Non-driven wheel The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle comprising:
   a fuel cell;
   an air compressor configured to provide intake air under pressure to the fuel cell; and
   an electric drive motor configured to drive the motor vehicle, wherein the electric drive motor is supplied with electric current by the fuel cell, and wherein the air compressor is driven by the electric drive motor,
   wherein the drive motor is connected to the air compressor by way of a torque-transmitting coupling.

2. The motor vehicle as claimed in claim 1, wherein the torque-transmitting coupling is designed with a switchable gear mechanism which can be switched into two stages.

3. The motor vehicle as claimed in claim 2, wherein the switchable gear mechanism can be coupled in a torque-transmitting manner to a drive axle of the motor vehicle.

4. The motor vehicle as claimed in claim 3, wherein the switchable gear mechanism can be coupled in a torque-transmitting manner to an air expander configured to discharge waste air under pressure from the fuel cell.

5. The motor vehicle as claimed in claim 2, wherein the switchable gear mechanism can be coupled in a torque-transmitting manner to an air expander configured to discharge waste air under pressure from the fuel cell.

6. A method for operating a fuel cell in a motor vehicle, comprising the acts of:

providing intake air under pressure to the fuel cell by way of an air compressor;
supplying an electric drive motor with electric current by the fuel cell;
driving the motor vehicle by way of an electric drive motor;
driving the air compressor by the electric drive motor; and
connecting the drive motor to the air compressor by way of a torque-transmitting coupling.

7. The method as claimed in claim 6, wherein the torque-transmitting coupling is configured with a switchable gear mechanism which is switched into two stages.

8. The method as claimed in claim 7, wherein the switchable gear mechanism is coupled in a torque-transmitting manner to a drive axle of the motor vehicle.

9. The method as claimed in claim 8, wherein the switchable gear mechanism is coupled in a torque-transmitting manner to an air expander configured to discharge waste air under pressure from the fuel cell.

10. The method as claimed in claim 7, wherein the switchable gear mechanism is coupled in a torque-transmitting manner to an air expander configured to discharge waste air under pressure from the fuel cell.

\* \* \* \* \*